(12) United States Patent
Cusenza et al.

(10) Patent No.: US 6,516,708 B2
(45) Date of Patent: *Feb. 11, 2003

(54) COOKING MACHINE

(75) Inventors: Anthony M. Cusenza, Thousand Oaks, CA (US); Luca Mainieri, Thousand Oaks, CA (US); Clark Foster, Laguna Niguel, CA (US)

(73) Assignee: Romar LLC, Thousand Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/094,329

(22) Filed: Mar. 8, 2002

(65) Prior Publication Data

US 2002/0112611 A1 Aug. 22, 2002

Related U.S. Application Data

(63) Continuation of application No. 09/785,509, filed on Feb. 16, 2001, now Pat. No. 6,360,652.

(51) Int. Cl.[7] .............................. A23L 1/00; A47J 37/00; A47J 27/00; A47J 27/18; A47J 43/04
(52) U.S. Cl. ............................. 99/330; 99/331; 99/352; 99/355; 99/403; 99/407
(58) Field of Search .................. 99/326–333, 352–355, 99/403–410, 337, 338; 426/509, 570, 523, 557, 458, 496

(56) References Cited

U.S. PATENT DOCUMENTS

| 3,937,135 A | 2/1976 | Pratolongo |
| 4,718,331 A | 1/1988 | Ansaloni et al. |
| 4,803,916 A | 2/1989 | Tacconi |
| 4,821,632 A | 4/1989 | Bolzani et al. |
| 4,954,359 A | 9/1990 | Pratolongo |
| 5,142,966 A | 9/1992 | Morandi et al. |
| 5,172,627 A | 12/1992 | Narcisi et al. |
| 5,361,682 A | 11/1994 | Crolla |
| 6,360,652 B1 * | 3/2002 | Cusenza et al. .............. 99/330 |

FOREIGN PATENT DOCUMENTS

WO  WO 87/04910  8/1987

* cited by examiner

*Primary Examiner*—Timothy F. Simone
(74) *Attorney, Agent, or Firm*—Pillsbury Winthrop LLP

(57) ABSTRACT

The present invention relates to an improved, simplified apparatus for rapidly cooking food in heated water with the assistance of increased pressure that provides the benefits of improved stirring capabilities, increased simplicity of the apparatus, and improved self-cleaning capabilities.

5 Claims, 5 Drawing Sheets

COOKING MACHINE

CROSS REFERENCE TO RELATED APPLICATIONS

This application is a continuation of U.S. patent application Ser. No. 09/785,509, now U.S. Pat. No. 6,360,652, filed on Feb. 16, 2001.

BACKGROUND OF THE INVENTION

1. Field of the Invention

The present invention relates to an apparatus for rapidly cooking food in heated water with the assistance of increased pressure.

2. Discussion of the Related Art

The relevant art teaches several automatic apparatuses for rapidly cooking, with increased pressure, doses of pasta in a relatively short time period. Generally, such automatic apparatuses are designed to cook pastas in a two-step process. The pasta is first exposed to high-temperature, high-pressure water for a brief period of time. The pasta is then exposed to heated water at a pressure and temperature that is lower than that which is used during the first stage of the cooking cycle to allow the pasta to continue cooking, and to absorb an appropriate amount of water. After the second stage of the cooking cycle, the pasta is then separated from the water. Once separated, the pasta is ready for consumption.

The apparatuses taught in the relevant art have several drawbacks. While some apparatuses are designed to allow an influx of water into the first cooking chamber to stir the pasta being cooked, this frequently is not sufficient. As a result, individual pieces of pasta tend to adhere to each other. Additionally, due to the apparatuses' enclosed design, they are difficult to clean. While it is possible to run a cooking cycle without the pasta to flush the apparatus with water, simply filling the apparatus with water, without more, does not sufficiently remove food residue from the interior of the apparatus. An improved apparatus that will alleviate these problems is desired.

DETAILED DESCRIPTION

Figure 1:
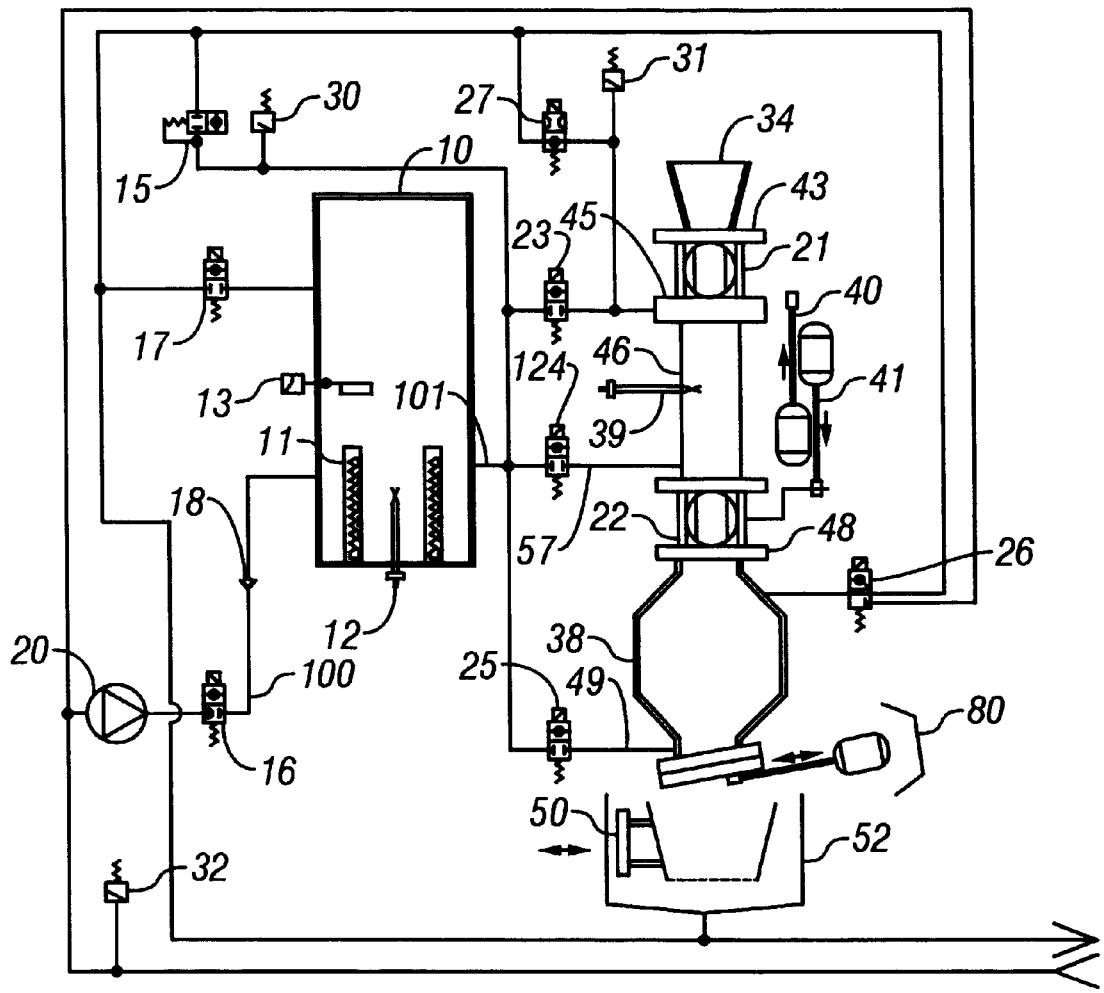
FIG. 1 illustrates a view of a process diagram according to an embodiment of the present invention.

The apparatus of the present invention is capable of cooking virtually any food product that may be cooked using overheated water and steam. Such foods include pastas, grains, vegetables, prepared frozen foods, seafood, and meats. The invention may be made in larger sizes to accommodate industrial amounts of food, and in smaller sizes to prepare smaller quantities of food.

Intake water that is used with the present invention may come from any suitable supply, such as a community water system. In the preferred embodiment of the present invention, the intake water is put through a water filter and a water softener prior to entering the main body of the present invention. This helps to ensure regular operation and reduces service and maintenance costs. Water entering the present invention may pass through an intake line pressure switch 32. This switch 32 ensures that pump 20 does not receive an inrush of water at greater-than-expected pressures.

The apparatus according to one embodiment of the present invention may be viewed as composed of essentially 4 components, the combination of which will be referred to as the apparatus: the boiler; the cooking stack or system; the programmable logic controller (PLC); and various accessories. The boiler primarily provides overheated water to the cooking system. The cooking stack is primarily composed of a cooking chamber 46, where the food is initially exposed to pressurized, heated water, and a conditioning chamber 38 where the food may absorb additional water and flavorings. The PLC may be a standard industry control device that is capable of reading electrical signals and generating outputs. The accessories include items that are required to manage water, steam, raw and cooked product, and perform the cycle in a suitable manner. Such items include, but are not limited to, solenoid valves, water pumps, pressure switches, drain lines, and a strainer.

FIG. 1 illustrates a view of a process diagram according to an embodiment of the present invention. The boiler 10 is configured to produce heated, pressurized water. In one embodiment of the present invention, this water is preferably heated to a temperature between 160 and 200 degrees Celsius, and pressurized to a pressure between 8 and 14 bar. In order to produce such heat and pressure, the boiler 10 is equipped with at least one heater 11. In one embodiment of the present invention, as depicted in FIG. 1, there is a plurality of heaters 11. Preferably, such heaters are metal-clad electrical resistance heaters; however, any appropriate heater as is known in the art may be used. Water enters the boiler 10 through inlet line 100 and leaves the boiler through outlet lines 101. The inlet line 100 and outlet lines 101 may each have valves as required to control fluid flow. Water is supplied to the boiler 10 through inlet line 100 by a pump, such as positive displacement pump 20, or any other pump as is known in the art. The positive displacement pump 20 may supply water to the boiler 10 at moderate pressure (2 to 4 bar).

The volume of the boiler 10 may vary depending on the intended production capacity of the apparatus of the present invention. In a preferred embodiment of the present invention, the boiler 10 holds approximately 6 liters of water.

As noted above, the level switch 13 operates to maintain the water level in the boiler 10. When the water in the boiler 10 falls below a certain level, level switch 13 may operate to activate the positive displacement pump 20 and open valve 16 and check valve 18. While such valves may be any appropriate valve as is known in the art, they are preferably solenoid valves.

There may be an additional check valve 18 that may operate to prevent hot boiler water from reaching the displacement pump 20 and causing damage if the boiler feed valve 16 fails to open. The temperature of the water inside boiler 10, is maintained at a set temperature by means of a temperature sensor 12. This temperature sensor 12 may be installed inside the boiler. This temperature sensor 12 may provide continuous or periodic readings of the water temperature. Preferably, the temperature is maintained above 100° C., and most preferably the water temperature is maintained at 180° C.

The pressure in the supply lines, the water level and temperature in the boiler 10, and he flow of the water through the valves and other control procedures may be controlled by he PLC. Specifically, for example, each time that water is withdrawn from the boiler 10 to begin the cooking cycle, the central processing unit or other suitable device restores the water, temperature and pressure automatically.

The programmable logic controller (PLC) (not shown) uses the temperature reading from the temperature sensor 12 to maintain the previously selected temperature in the boiler 10 by controlling the power going to the heaters 11. For the purposes of this description of the present invention, it is presumed that any embodiment of the present invention would include a power source and all wires, connections, interfaces and power systems necessary to allow the system to interface with the PLC. The PLC may be made accessible to the user at a control box, such as control box 62 (See FIG. 2).

Figure 2:
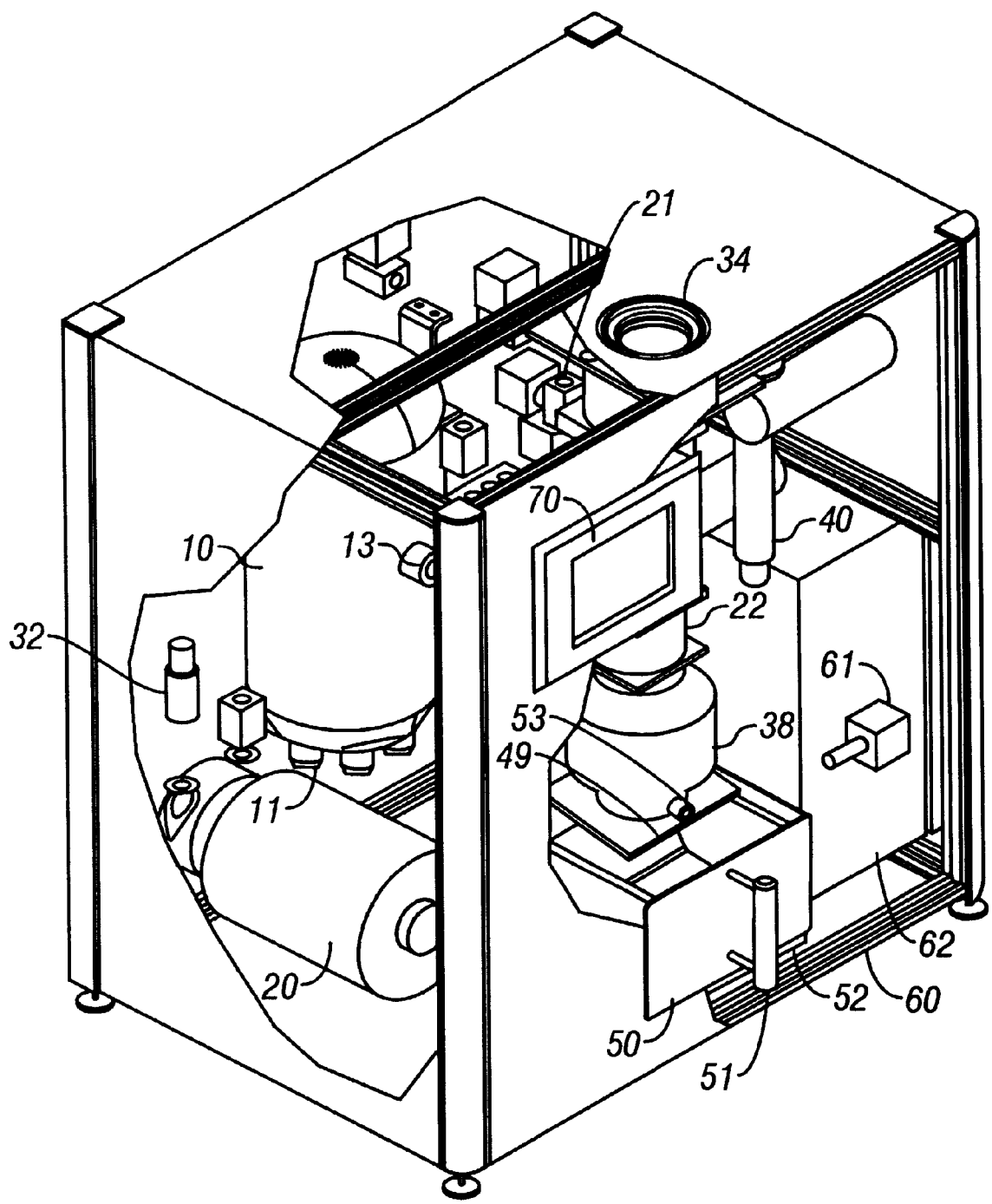
FIG. 2 illustrates a perspective view of one embodiment of the present invention, with the exterior panels partially shown.

As show in FIG. 2, the apparatus of the present invention may be encased in an exterior casing (not numbered). This casing serves to contain the system, and may provide some insulation. Such casing may have a frame 60.

As shown in FIG. 1, the boiler 10 may be equipped with several features that serve to ensure first that the boiler 10 will maintain an adequate supply of heated, pressurized water and, secondly, that the boiler 10 does not become over-pressurized. Such over-pressurization could result in rupturing of the system or even explosion of the boiler 10. In a preferred embodiment of the present invention, there is a level switch 13 that measures the water level in the boiler 10, and sends signals to the PLC when there is sufficient (or excess) water in the boiler 10, and when water needs to be added. There is also a thermocouple temperature sensor 12. Additionally, there may be a pressure switch 30 that interrupts the power going to the heaters 11 and pump 20 if the boiler pressure exceeds a preset pressure threshold may be included. Alternatively, or additionally, there may be a relief valve 15 which may release excess pressure from boiler 10 when the pressure inside the boiler 10 reaches a preset pressure into a line which will route the steam, water and/or air through the system and eventually to the drip tray 52. If this relief valve 15 is used in conjunction with the pressure switch 30, the preset pressure should be is higher than the pressure at which the pressure switch 30 is set. In this situation where the two safety devices are used in conjunction, the relief valve 15 acts as a backup system in the case the pressure switch 30 fails.

In a preferred embodiment of the present invention, the entire system is insulated in order to minimize heat losses. Such insulation may be any appropriate insulation as is known in the art.

Figure 3:
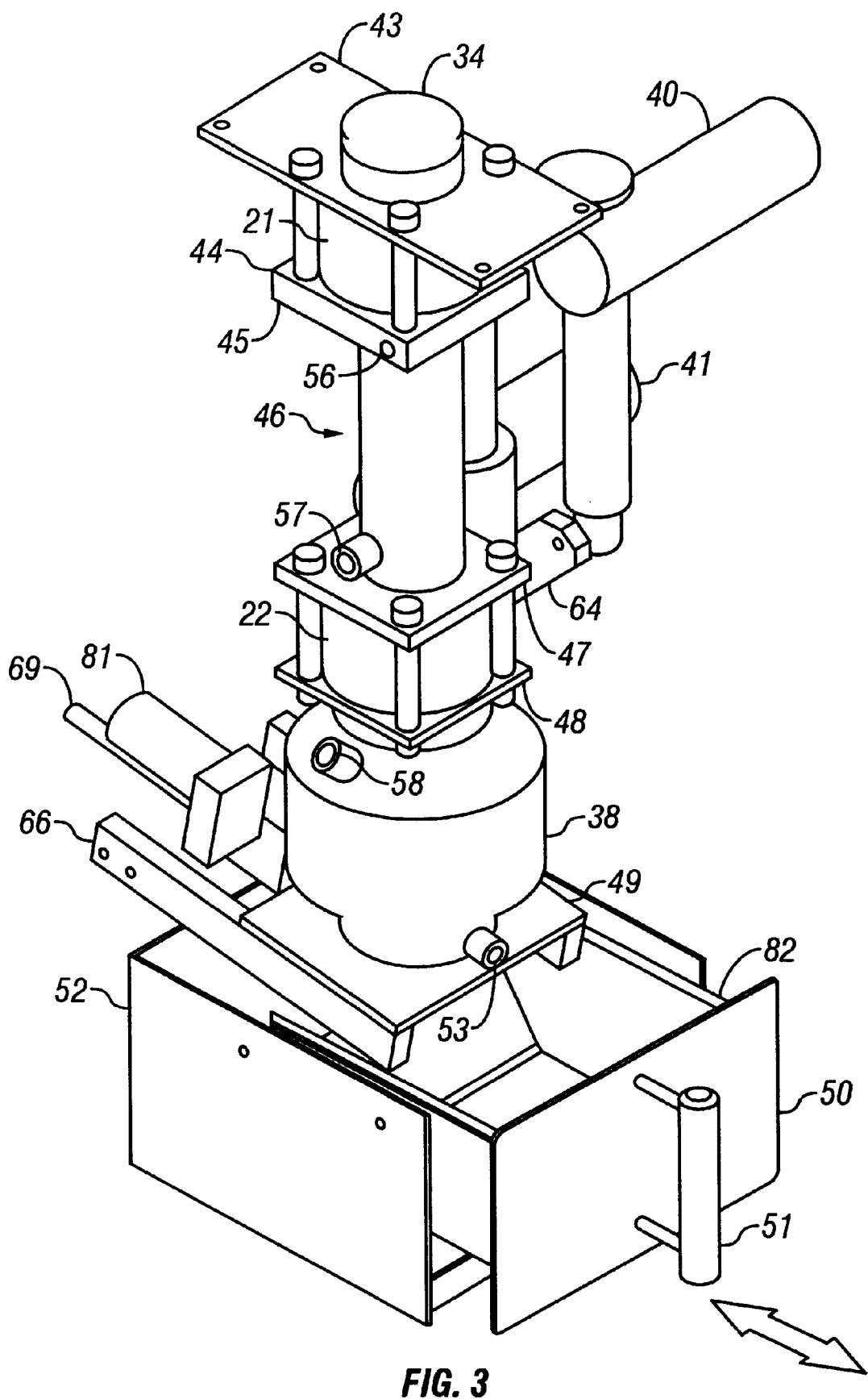
FIG. 3 illustrates a perspective view of a cooking stack according to an embodiment of he present invention.
Figure 5:
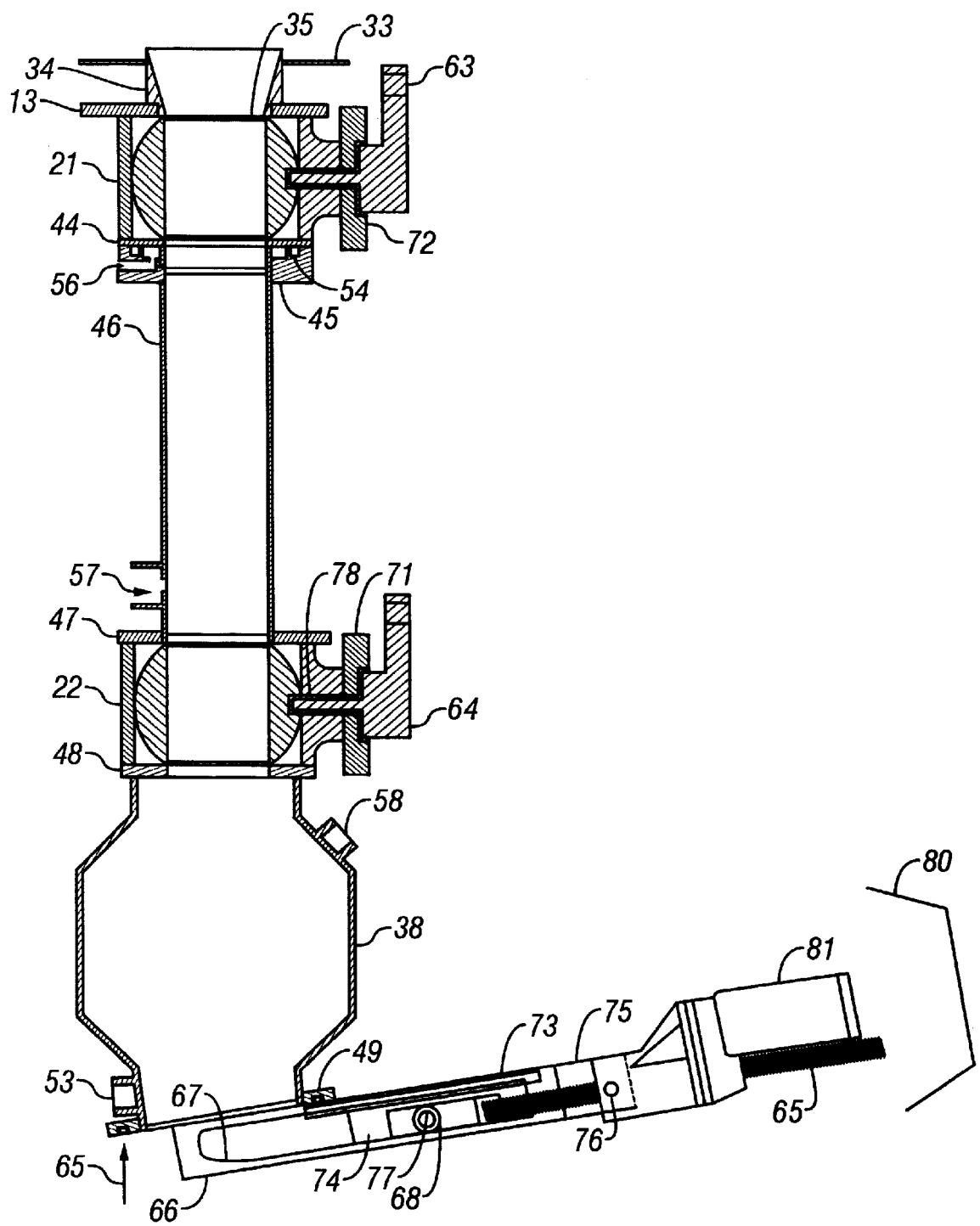
FIG. 5 illustrates a cross-section of a cooking stack according to an embodiment of the present invention.

The cooking stack, which may be seen in greater detail in FIGS. 3 and 5, is designed to cycle a measured, predetermined amount of food through a two stage cooking process. The food is first exposed to heated, pressurized, water in a cooking chamber 46, then passed to a conditioning chamber 38 where it may absorb additional water and seasonings, if desired. These seasonings may be initially placed into the system with the food product as it enters the cooking chamber. Alternatively, there may be an opening (not shown) in the conditioning chamber through which a user may add seasonings before the heated water and food enters.

The cooking stack is generally composed of a plurality of parts that are aligned in a liner, and preferably vertical, manner. As shown in the figures in varying detail, there is a funnel 34 which leads to the mounting plate 43. This funnel 34 is preferably coupled to the mounting plate 43. There is also a cooking chamber 46 located beneath the funnel, in which the product to be cooked is first exposed to the heated, pressurized water. The cooking chamber 46, has an upper flange 45, which upper flange is designed to be a swirl flange in the embodiment of the present invention shown in FIG. 4, and a lower flange 47. An upper ball valve 21 and seal plate 44 are located between the mounting plate 43 and the cooking chamber swirl flange 45. There is also a vent valve 27, which may be a solenoid valve, that is associated with the cooking chamber 46 to permit the release of pressure from the cooking chamber 46. Such release of pressure may be associated with an over-pressurization of the cooking chamber 46, with a desired agitation of the cooking food, or with the transfer of food from the cooking chamber 46 to the conditioning chamber 38.

The cooking chamber 46 may be located directly below the cooking chamber swirl flange 45. The cooking chamber 46 may be tube-like in shape, as shown in the figures. However, the cooking chamber 46 may take any shape that permits the ready flow of water and material that is being cooked from the cooking chamber 46 to a conditioning chamber 38.

The cooking chamber 46 is prepared for operation by closing the lower ball valve 22 and opening the upper ball valve 21. The upper ball valve may be performed by an upper ball valve actuator 40, while the lower ball valve may be performed by a lower ball valve actuator 41. The opening and closing of the upper ball valve 21 and the lower ball valve 22 may be controlled by the PLC, or may be designed so that they may be manually opened. Such manual manipulation may be included in one embodiment of the present invention as a safety feature, since it allows a user to bypass the PLC in case the PLC fails to operate appropriately.

Uncooked food is fed through the funnel 34 and into the cooking chamber 46. Movement of the uncooked food through the funnel 34 and into the cooking chamber 46 may be controlled by the opening and/or closing of the upper ball valve 21 and the force of gravity. The upper ball valve 21 is then closed, and hot, pressurized water is allowed to enter the bottom of the cooking chamber 46 through the cooking chamber inlet line 57 until it covers the food to be cooked. Inlet line 57 preferably feeds the heated, pressurized water into the bottom of cooking chamber 46. This prevents linear pasta and other elongated foods from being broken by the force of the inrush of overheated pressurized water into the cooking chamber 46, stirs the food being cooked, and facilitates even cooking.

The flow of the hot, pressurized water may be controlled by a valve 24, which may be a solenoid valve, to ensure that the cooking chamber 46 receives sufficient water, yet does not receive too much water. The cooking chamber 46 should be sized such that once it has received the food and the hot, pressurized water, there should be only a small amount of air in the cooking chamber. Due to gravity, the food being cooked is generally located in the lower portion of the cooking chamber 46, and should be generally covered by the high temperature water.

The upper ball valve 21 and lower ball valve 22 provide a high pressure seal that prevents water and/or steam from escaping during the cooking cycle. Additionally, the cooking chamber 46 is equipped with a pressure switch 31 that prevents the opening of both the upper ball valve 21 and lower ball valve 22 if there is a high pressure in the cooking chamber 46. This safety feature prevents high temperature water from escaping from the cooking chamber 46 during the cooking cycle.

There is also a thermocouple 39 attached to the exterior of the cooking chamber 46. This provides temperature feedback to the PLC. Based on this information, the PLC may add heat to the cooking chamber 46 by opening valve 24 and allowing heated, pressurized water to flow into the cooking chamber 46. Alternatively, the PLC may reduce the heat in the cooking chamber 46 by opening the vent valve 27 and allowing air, steam and heated water to escape from the cooking chamber 46.

During the time that the food is located in the cooking chamber 46, it is desirable to agitate the food to promote uniform cooking and minimize the food's tendency to adhere to itself This may be done while the valve 24 is closed by venting a small amount of pressure through the vent valve 27 that is associated with the cooking chamber 46. The reduction in pressure will cause the high temperature, pressurized water in the cooking chamber to boil, thereby agitating the food. Further agitation may be provided by briefly reopening the cooking chamber fed valve 24 after the venting step to allow for an influx of heated, pressurized water. This will also restore some of the heat and pressure that was lost during the venting agitation step. The PLC of the present may be pre-programmed to perform these steps periodically, or almost continuously throughout the time that the food is in the cooking chamber 46.

Figure 4:
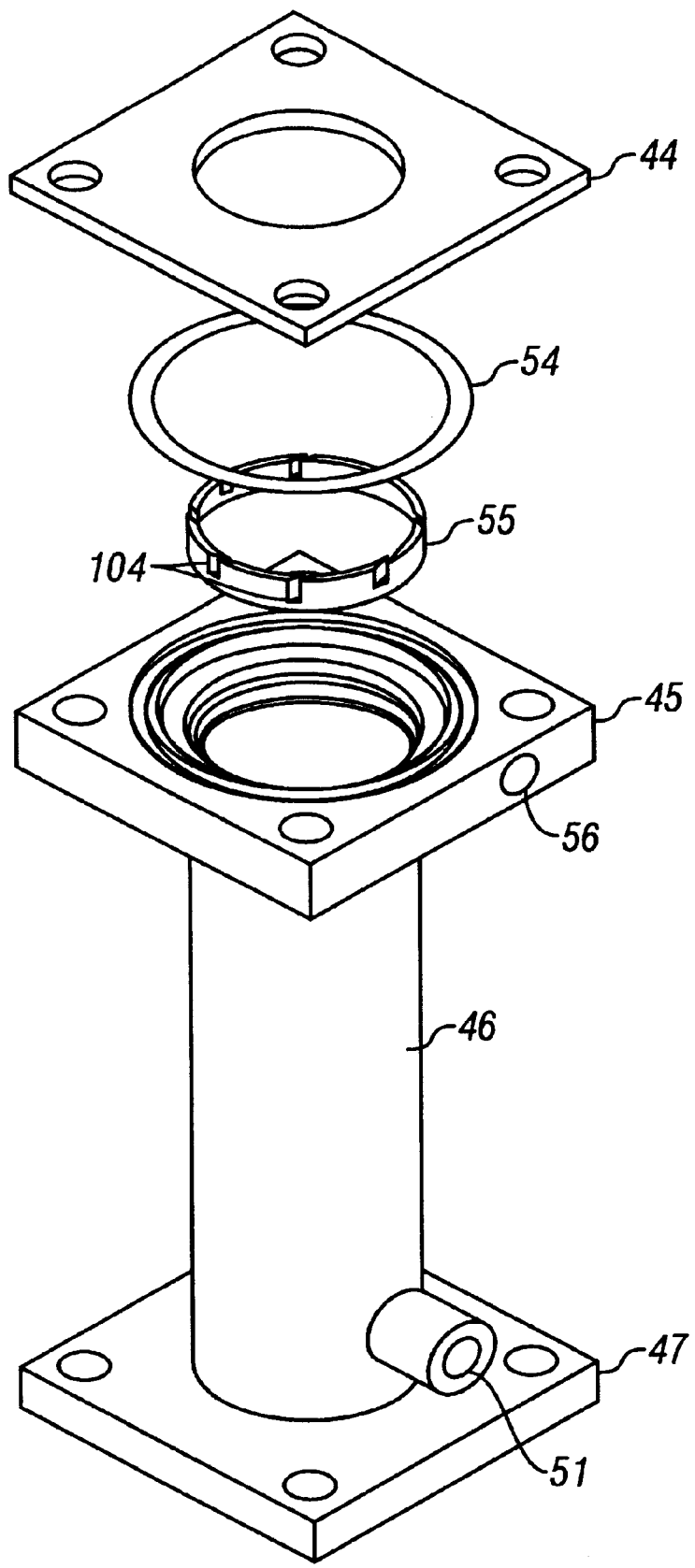
FIG. 4 illustrates an exploded perspective view of a cooking chamber according to an embodiment of the present invention.

In the preferred embodiment of the present invention, the vent valve 27 is designed to ensure that air, not water, is primarily venting process. As such, the location of the vent valve 27 is preferably towards the top of the cooking chamber 46 so that steam is vented instead of water. Additionally, flange 45 may be a swirl flange that is equipped with a swirl ring 55. The swirl ring 55, as shown in FIG. 4, may be equipped with a multiple of slots 104 to provide multiple paths from the cooking chamber 46 to the swirl inlet line 56. The swirl inlet line 56 leads to vent valve 27 as well as to boiler 10. The flow of water through swirl inlet line 56 from the boiler 10 may be controlled by a valve 23. There may also be an o-ring or washer 54 located between the upper flange 45 and the seal plate 44. The seal plate 44 serves to hold the washer 54 and the swirl ring 55 in position so that a seal is formed; this may be is assisted by an o-ring 54 which may be located between the seal plate 44 and the swirl flange 45.

The multiple slots 104, which are located towards the top of the cooking chamber 46, serve several purposes. First, they are sized to prevent food from escaping. Secondly, they help to ensure that steam, and not water, escape through the vent valve 27. Additionally, as described below, they assist in the cleaning cycle of the invention.

The conditioning chamber 38 is located below the cooking chamber 46. The conditioning chamber 38 has an upper flange 48 and a lower flange 49. A valve such as a ball valve 22 may be located between the cooking chamber lower flange 47 and the conditioning chamber top flange 48. There may also be a slide valve assembly 80 coupled to the lower flange 49 that may be opened when it is desired to remove the cooked food from the conditioning chamber. This slide valve assembly 80 may be opened when the operator desires to remove the cooked food from the conditioning chamber, or after a predetermined mount of time has elapsed. As shown in FIG. 3, A strainer 50, with optional handle 51 and a drip tray 52 may be located under the conditioning chamber 38 to receive the cooked food once the slide valve assembly 80 is opened and the cooked food is removed from the conditioning chamber.

Once the food in the cooking chamber 46 has been exposed to the high temperature pressurized water for a sufficient amount of time, it is ready to be transferred to the conditioning chamber 38. Before transfer, the elevated pressure in the cooking chamber 46 is preferably reduced to by opening the vent valve 27. This reduced pressure is preferably from 1 to 2 bar. The reduction in pressure reduces the possibility of a high velocity flow that may damage the food being cooked. The lower ball valve 22 may then be opened to allow the food and heated water drop into the conditioning chamber 38. This movement of the water and food may be caused primarily by gravity. The movement of the water and food may be also caused or facilitated by residual pressure left in the cooking chamber 46 after vent valve 27 has been opened. Such natural movement of the water and food product obviates the need for additional pumps, the action of which may break or otherwise damage the food, to move food between stages. The slide valve assembly 80 at the bottom of the conditioning chamber 38 is preferably closed at the time the lower ball valve 22 is opened. Valve 22 is then closed after the water and food product have passed into the conditioning chamber 38.

The closing of the ball valve 22 isolates the cooking chamber 46 from the conditioning chamber 38. As such, cooking chamber 46 will be ready to repeat the cooking cycle once the ball valve 22 is closed.

If the slide valve assembly 80 was closed at the time the lower ball valve 22 was opened, the conditioning chamber 38 will retain the food in a pool of heated water, and allow the food to further cook and/or absorb water. Alternatively, if a conditioning step is not desired by the operator, the slide valve assembly may remain open at the time the lower ball valve is opened, and the food and water may proceed directly to the strainer. The texture of the food may be affected by time, temperature and agitation. To optimize the conditioning effect, the conditioning chamber 38 is equipped with hot and cold water supplies. The cold water may be supplied by a cold water intake line 26 and may enter the conditioning chamber 38 through the conditioning chamber cold water inlet 58. The hot water may enter the conditioning chamber 38 through a hot water intake line and valve 25 from the boiler 10 to the hot water inlet 53. The hot water inlet 53 is preferably located near the bottom of the conditioning chamber 38 so that the blast of heated water will further agitate the cooking and conditioning food.

Once the food in the conditioning chamber 38 has been exposed to the heated water for a sufficient amount of time, the slide valve assembly 80 may be opened so that the food can drop into the strainer 50. A preferred embodiment of the invention includes a safety sensor (not shown) that prevents the slide valve assembly 80 from opening when the strainer 50 is not in place. This prevents the operator of the invention from the burns that may be caused by when the hot food and water spills out. Additionally, the placement of the strainer 50 prohibits the operator from placing their hand in the path of the hot food and water. The strainer 50 may also be retained by a latch assembly 61 (see FIG. 2) that locks the strainer 50 in position and releases only after excess water has drained from the cooked food.

Once the latch assembly 61 unlocks, the strainer 50 may be removed, and the contents may be accessible for their intended use (individual servings, large platters, storage, etc.). The empty strainer 50 may then be replaced so that it is ready to receive the next batch of cooked product. When processing batches of food in succession, the cooking chamber 46 and conditioning chamber 38 will both contain product at the same time. To accommodate this, if the length of time the food is in the cooking chamber 46 is shorter than the time that the food is in the conditioning chamber 38, the operator may either (1) space the input of food into the cooking chamber 46 so that the conditioning chamber 38 is timed to be empty when the food is due to be transferred from the cooking chamber 46 to the conditioning chamber 38 or (2) adjust the length of time of each cycle so that the conditioning chamber 38 cycle is not longer than the cooking chamber 46 cycle.

The PLC may be any electronic control device as is known in the industry. It should be capable of reading electrical signals from a variety of sensors, such as pressure switches, position sensors and thermocouples. In a preferred embodiment of the present invention, the PLC is capable of interacting with a touch screen 70 to allow an operator to command the PLC to initiate and perform a cooking sequence. The PLC takes input from such sensors, performs a logic sequence, and generates a series of outputs. These outputs take the form of a display on the touch screen 70 that provides information to the operator. The outputs also include the electrical signals that operate the valves, heaters and motors that are required to execute the cook sequence.

In a preferred embodiment of the present invention, the PLC is equipped with modem capacity. This permits remote monitoring of the functions of the invention. The monitoring can be used for billing, inventory control, and diagnostic purposes.

The present invention has a cleaning cycle in which high temperature water is passed through the apparatus. During this cycle, valve 23 is opened to allow hot water to flow through the swirl inlet line 56. This water is directed to swirl ring 55. The slots 104 in the swirl ring 55 are oriented to direct cleaning water tangentially along the inner wall of the cooking chamber 46. The high velocity and the centrifugal force of the swirling water on the inside of the cooking chamber 46 enhance the action of the cleaning water. Further, the high temperature pressurized water that is used to wash the apparatus is hot enough to kill bacteria, either in liquid or vapor form. This is a significant improvement over the cleaning methods that are known in the art.

The drain line is also regularly cleaned to prevent bacteria build-up. The vent lines that transport high temperature fluid and steam are routed to the drain fitting on the drip tray 52. This ensures that the drain line is purged with steam every cooking cycle.

FIG. 5 illustrates a cross-section of a cooking stack according to an embodiment of the present invention. In this embodiment of the invention, the cooking chamber 46 is located above the conditioning chamber 38. While the cooking chamber 46 shown is primarily tubular and the conditioning chamber 38 has a bulbous shape, it should be understood that these aspects of the present invention may take any shape that is appropriate for the cooking of food as taught by the present invention.

As may be seen in FIG. 5, food may be provided to the cooking chamber 46 through funnel 34. This funnel may be covered by a top plate 33 to prevent unwanted materials from dropping into the funnel and, consequently, into the cooking chamber 46. Towards the bottom of the funnel 34, there is a sliding door 35 that may be opened when it is desired to add food to the cooking chamber 46 at an appropriate point in the cooking cycle. Such opening may be performed by a sliding door actuator 42. The funnel 34 is mounted on the apparatus at the mounting plate 43. Upper ball valve 21 is located below the mounting plate 43. Upper ball valve 21 may be opened by any means as is known in the art, such as upper actuator crank 63. Upper ball valve motor 71 may be used to open upper ball valve 21. Below the upper ball valve 21, the seal plate 44 and cooking chamber o-ring 54, which provide a seal between the ball valve 21 and the cooking chamber 46, may be seen. Swirl inlet line 56, which provides pressurized, heated water, and swirl flange 45 may also be seen in this view of the present invention.

Cooking chamber inlet line 57, through which heated, pressurized water may enter the cooking chamber 46, is also shown in the view of FIG. 5. The cooking chamber inlet line 57 is preferably located towards the bottom of the cooking chamber 46 to allow the heated, pressurized water to enter the cooking chamber 46 without subjecting the food to be cooked to unnecessary forces. A cooking chamber lower flange 47 is also located towards the bottom of the cooking chamber. A lower ball valve, through which food and heated water may flow into the conditioning chamber 38, is located below lower flange 47. Lower ball valve 21 may be opened by any means as is known in the art, such as lower actuator crank 64. Lower ball valve 21 is also equipped with ball valve stam 78 and a lower ball valve motor 72, which may be used to open lower ball valve 21.

The conditioning chamber 38 has an upper flange 48 and a lower flange 49. There is a cold water inlet line 58 to allow cool water to enter the conditioning chamber 38, and a hot water inlet line 53 to allow heated water from the boiler 10 to enter the conditioning chamber. Hot water inlet line 53 is preferably located towards the bottom of conditioning chamber 38 so that the addition of heated, pressurized water may be used to agitate or stir the cooking food.

As further shown in FIG. 5, in one embodiment of the invention there may be a slide valve assembly 80 coupled to the lower flange 49 that may be opened when it is desired to remove the cooked food from the conditioning chamber. Such slide valve assembly 80 may include a sliding door o-ring 65 to provide an adequate seal between the conditioning chamber 38 and the sliding door plate 73. The sliding door plate 73 may be supported and guided by a sliding door plate support 74. The sliding door plate 73 may also be supplied with sliding door rails 66 along which it may slide. A wheel 68 may rotate about an axle 77 to facilitate and guide the movement of the sliding door plate 73. The slide valve assembly 80 may also have a sliding door plate activator 81 to and a sliding door activator bracket 75, which served to link the sliding door plate activator 81 to the apparatus. The actuator 81 may pivot around a lead screw 69 at pivot 76. The sliding door plate 73 may be moved into either an open position or a closed position by the turning of the lead screw 69. The sliding door actuator 81, which controls the turning of the lead screw 69 may be manually manipulated to open the slide plate door. Alternatively, the PLC may be programmed to open the sliding door plate 73 when the food has spent sufficient time in the conditioning chamber 38. There may also be what will be referred to as a cam track 67, which is a track along which those portions of the present invention that are joined to the sliding door plate 73 may move.

While a detailed description of a slide valve assembly 80 has been provided, it should be understood that any configuration that would allow for a controllable opening at the bottom of the conditioning chamber is within the scope of this disclosure.

As noted above, a preferred embodiment of the present invention has a cooking stack that is primarily vertical. That is, the cooking chamber 46 is arranged so that it is located substantially above the conditioning chamber 38. While a large set-up may be suitable in some settings, it may be preferable to limit the height of the present invention so that it is appropriately sized for a larger number of spaces. To this end, it may be preferable to limit the height of the cooking chamber so that it is suitable for cooking food that is no longer than 7.5 inches in length.

While the materials of the present invention may be made from any reasonable material as is known in the art, it is preferable that the portions of the present invention that contact food are preferably made from stainless steel. The stainless steel has a tendency to shed food build up after a thorough rinse with water, such as the manner described above.

What is claimed is:

1. An apparatus for cooking of foods, comprising a cooking chamber having a top portion and a bottom portion;

a conditioning chamber having a top portion and a bottom portion, and further wherein the conditioning chamber is located below and in flow communication with the cooking chamber;

a first port in flowable communication with the top portion of the cooking chamber for introducing food products into the cooking chamber;

a second valve in flowable communication with the cooking chamber and the conditioning chamber, wherein water and food products flow through the second valve from the cooking chamber to the conditioning chamber, and further wherein the second valve, the cooking chamber and the conditioning chamber are positioned in a manner such that gravity moves the water and food products from the cooking chamber to the conditioning chamber;

a water boiler having means for monitoring the condition of the water in the boiler;

a heater joined to the water boiler, for heating the water in the boiler;

a pressure relief valve joined to the cooking chamber, for selectively releasing the pressure therein;

a conduit in flow communication between the water boiler and the cooking chamber, for directing heated water into the cooking chamber;

a means for directing water to the water boiler;

a second conduit in flow communication between the water boiler and the conditioning chamber, for directing water from the water boiler to the conditioning chamber; and an outlet located adjacent the bottom of the conditioning chamber, for selectively dispensing cooked food and water.

2. The apparatus as in claim 1, wherein the cooking chamber and conditioning chamber are in vertical alignment.

3. An apparatus for cooking of foods, comprising a cooking chamber having a top portion and a bottom portion;

a conditioning chamber having a top portion and a bottom portion, and further wherein the conditioning chamber is located below and in flow communication with the cooking chamber;

a first port in flowable communication with the top portion of the cooking chamber for introducing food products into the cooking chamber;

a second valve in flowable communication with the cooking chamber and the conditioning chamber, wherein water and food products flow through the second valve from the cooking chamber to the conditioning chamber, and further wherein the second valve, the cooking chamber and the conditioning chamber are positioned in a manner such that gravity moves the water and food products from the cooking chamber to the conditioning chamber;

a water boiler having means for monitoring the condition of the water in the boiler;

a heater joined to the water boiler, for heating the water in the boiler;

a pressure relief valve joined to the cooking chamber, for selectively releasing the pressure therein;

a conduit in flow communication between the water boiler and the cooking chamber, for directing heated water into the cooking chamber;

a means for directing water to the water boiler;

a second conduit in flow communication between the water boiler and the conditioning chamber, for directing water from the water boiler to the conditioning chamber; and an outlet located adjacent the bottom of the conditioning chamber, for selectively dispensing cooked food and water a swirl flange having a plurality of grooves surrounding an open center, wherein the swirl flange is joined to the top portion of the cooking chamber;

a swirl ring having a plurality of slots, wherein the swirl ring is placed so that it is adjacent to the grooves of the swirl flange;

an o-ring located above the swirl ring and the swirl flange, wherein the o-ring provides a seal;

a seal plate removeably located above the swirl flange, wherein the seal plate serves to hold the o-ring and the swirl ring in position.

4. The apparatus as in claim 3, wherein the cooking chamber and conditioning chamber are in vertical alignment.

5. The apparatus as in claim 3, wherein the boiler, cooking chamber and conditioning chamber are generally contained within a housing.

* * * * *